(12) United States Patent
Doddaiah et al.

(10) Patent No.: US 11,989,437 B1
(45) Date of Patent: May 21, 2024

(54) COMPRESSION ORCHESTRATION ON A REMOTE DATA REPLICATION FACILITY

(71) Applicant: Dell Products, L.P., Hopkinton, MA (US)

(72) Inventors: Ramesh Doddaiah, Westborough, MA (US); Owen Martin, Hopedale, MA (US)

(73) Assignee: Dell Products, L.P., Hopkinton, MA (US)

( * ) Notice: Subject to any disclaimer, the term of this patent is extended or adjusted under 35 U.S.C. 154(b) by 0 days.

(21) Appl. No.: 18/299,765

(22) Filed: Apr. 13, 2023

(51) Int. Cl.
G06F 3/06 (2006.01)

(52) U.S. Cl.
CPC .......... G06F 3/065 (2013.01); G06F 3/0604 (2013.01); G06F 3/0679 (2013.01)

(58) Field of Classification Search
CPC ....... G06F 3/065; G06F 3/0604; G06F 3/0679
USPC ........................................................ 711/154
See application file for complete search history.

(56) References Cited

U.S. PATENT DOCUMENTS

| | | | | |
|---|---|---|---|---|
| 9,454,321 B1* | 9/2016 | Smaldone | ............... | G06F 3/061 |
| 10,146,459 B1* | 12/2018 | Gao | ............... | G06F 3/0619 |
| 2014/0207745 A1* | 7/2014 | Groseclose | ........... | G06F 3/0638 |
| | | | | 707/693 |
| 2017/0046074 A1* | 2/2017 | Wang | ............... | G06F 3/0608 |
| 2020/0348840 A1* | 11/2020 | Krasner | ............... | G06F 3/0674 |
| 2020/0349094 A1* | 11/2020 | Smith | ............... | H04L 67/1029 |
| 2021/0233294 A1* | 7/2021 | Nunez | ............... | H04L 41/0654 |

* cited by examiner

Primary Examiner — Than Nguyen
(74) Attorney, Agent, or Firm — Anderson Gorecki LLP

(57) ABSTRACT

A primary storage array and a remote storage array each create compressibility heat maps and periodically exchange compressibility heat maps over a remote replication facility. The primary R1 storage array also forwards an Activity Based Compression (ABC) heat map describing extent IO activity to the remote storage array. The primary and remote storage arrays use the compressibility heat maps to update per-extent compressibility forecast models to forecast compressibility values for extents during an upcoming time interval. The storage arrays use both activity-based scores and forecast compressibility scores to select extents to be stored in compressed and uncompressed form. By considering both the activity-based scores as well as compressibility scores, it is possible to prioritize compression resources by selecting the most compressible extents with the lowest activity-based scores for compression, while selectively enabling extents with higher activity-based scores and high compressibility scores to also be selected for compression.

20 Claims, 11 Drawing Sheets

ABC based compression

ABC&CHM based compression

COMPRESSION ORCHESTRATION ON A REMOTE DATA REPLICATION FACILITY

FIELD

This disclosure relates to computing systems and related devices and methods, and, more particularly, to compression orchestration on a remote data replication facility.

SUMMARY

The following Summary and the Abstract set forth at the end of this document are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

According to some embodiments, a primary R1 storage array and a remote R2 storage array create compressibility heat maps and periodically exchange the compressibility heat maps over a remote replication facility. During each compressibility heat map exchange cycle, the primary R1 storage array and remote R2 storage array merge their locally generated compressibility heat map with the compressibility heat map received from the other storage array, to generate a merged compressibility heat map. The primary R1 storage array also forwards the ABC heat map describing extent IO activity to the remote R2 storage array. After merging the compressibility heat maps, each of the primary R1 storage array and remote R2 storage array use their locally created merged compressibility heat map and the ABC heat map to update per-extent compressibility forecast models, and the per-extent compressibility forecast models are then used during a subsequent time period to make compression decisions to select a first subset of extents for be stored in compressed form and a second subset of extents to be stored in uncompressed form. Since the different storage arrays might have different performance and data reduction rate targets, the different storage arrays might include different extents in each of the first and second subsets. By considering both the ABC IO score as well as forecast compressibility score, it is possible to prioritize compression resources by selecting the most compressible extents with the lowest IO score for compression, while selectively enabling extents with higher ABC IO scores and high forecast compressibility scores to also be selected for compression.

In some embodiments, a method of compression orchestration on a remote data replication facility including a primary storage array and a remote storage array, includes synchronizing extents of data between the primary storage array and the remote storage array over the remote data replication facility as host write operations occur on the extents of data on the primary storage array, transmitting an IO activity heat map from the primary storage array to the remote storage array on the remote data replication facility, and exchanging compressibility heat maps between the primary storage array and remote storage array over the remote data replication facility, each respective compressibility heat map containing per-extent compressibility information determined by the respective primary storage array or remote storage array. The method also includes creating a per-extent compressibility forecast model for each extent of data by each of the primary storage array and remote storage array, each per-extent compressibility forecast model being based on a set of previously observed compressibility values for the extent over a preceding set of previous time periods, using the exchanged compressibility heat maps to update the per-extent compressibility forecast models, and determining a forecast compressibility value for each extent from the updated per-extent compressibility forecast models for an upcoming time period. The method also includes selecting a first set of extents to be compressed by the primary storage array based on the IO activity heat map, per-extent forecast compressibility values for each extent determined from the updated per-extent compressibility forecast models on the primary storage array, and a first target data reduction rate on the primary storage array, and selecting a second set of extents to be compressed by the remote storage array based on the IO activity heat map, per-extent forecast compressibility values for each extent determined from the updated per-extent compressibility forecast models on the remote storage array, and a second target data reduction rate on the remote storage array.

In some embodiments, determining the forecast compressibility value for each extent from the updated per-extent compressibility forecast models for an upcoming time period is implemented separately by each of the primary storage array and remote storage array.

In some embodiments, each per-extent compressibility forecast model is an Auto-Regressive Integrated Moving Average (ARIMA) model, an Exponential Moving Average (EMA) model, or a Simple Moving Average (SMA) model.

In some embodiments, exchanging compressibility heat maps between the primary storage array and remote storage array over the remote data replication facility, includes creating a first local compressibility heat map by the primary storage array, creating a second local compressibility heat map by the remote storage array, transmitting the first local compressibility heat map from the primary storage array to the remote storage array, transmitting the second local compressibility heat map from the remote storage array to the primary storage array, generating a first merged compressibility heat map by the primary storage array by merging the first local compressibility heat map and the received second local compressibility heat map, and generating a second merged compressibility heat map by the remote storage array by merging the second local compressibility heat map and the received first local compressibility heat map. In some embodiments, using the exchanged compressibility heat maps to update the per-extent compressibility forecast models includes using the first and second merged compressibility heat maps to update the per-extent compressibility forecast models. In some embodiments, the first and second local compressibility heat maps identify compression write operations implemented by each respective storage array on the extents, and merging includes determining a weighted average compressibility estimate for each respective extent based on numbers of compression write operations by each storage array on the respective extent.

In some embodiments, the method further includes creating an uncompressed extent lookup table on the primary storage array, the uncompressed extent lookup table including addresses of respective extents that have been selected to be not compressed.

In some embodiments, the method further includes receiving a write operation on an extent by the primary storage array, the write operation including an address of the respective extent, determining if the address of the respective extent is contained in the uncompressed extent lookup table, in response to a determination that the address is not contained in the uncompressed extent lookup table, compressing data associated with the write operation prior to storing the data, and in response to a determination that the address is contained in the uncompressed extent lookup table, determining if the address was included in the uncompressed extent lookup table due to high IO activity or high compressibility.

In some embodiments, in response to a determination that the address was included in the uncompressed extent lookup table due to high IO activity, the method includes determining if additional data reduction is required. In response to a determination that additional data reduction is required, compressing the data associated with the write operation prior to storing the data, and in response to a determination that additional data reduction is not required, not compressing the data associated with the write operation prior to storing the data.

In some embodiments, in response to a determination that the address was included in the uncompressed extent lookup table due to high compressibility, the method includes implementing Bayesian sampling to determine if the data associated with the write operation should be compressed prior to storing the data.

In some embodiments, a system of compression orchestration on a remote data replication facility including a primary storage array and a remote storage array, includes one or more processors and one or more storage devices storing instructions that are operable, when executed by the one or more processors, to cause the one or more processors to perform operations including synchronizing extents of data between the primary storage array and the remote storage array over the remote data replication facility as host write operations occur on the extents of data on the primary storage array, transmitting an IO activity heat map from the primary storage array to the remote storage array on the remote data replication facility, and exchanging compressibility heat maps between the primary storage array and remote storage array over the remote data replication facility, each respective compressibility heat map containing per-extent compressibility information determined by the respective primary storage array or remote storage array. The operations further include creating a per-extent compressibility forecast model for each extent of data by each of the primary storage array and remote storage array, each per-extent compressibility forecast model being based on a set of previously observed compressibility values for the extent over a preceding set of previous time periods, using the exchanged compressibility heat maps to update the per-extent compressibility forecast models, and determining a forecast compressibility value for each extent from the updated per-extent compressibility forecast models for an upcoming time period. The operations further include selecting a first set of extents to be compressed by the primary storage array based on the IO activity heat map, per-extent forecast compressibility values for each extent determined from the updated per-extent compressibility forecast models on the primary storage array, and a first target data reduction rate on the primary storage array, and selecting a second set of extents to be compressed by the remote storage array based on the IO activity heat map, per-extent forecast compressibility values for each extent determined from the updated per-extent compressibility forecast models on the remote storage array, and a second target data reduction rate on the remote storage array.

In some embodiments, determining the forecast compressibility value for each extent from the updated per-extent compressibility forecast models for an upcoming time period is implemented separately by each of the primary storage array and remote storage array.

In some embodiments, each per-extent compressibility forecast model is an Auto-Regressive Integrated Moving Average (ARIMA) model, an Exponential Moving Average (EMA) model, or a Simple Moving Average (SMA) model.

In some embodiments, exchanging compressibility heat maps between the primary storage array and remote storage array over the remote data replication facility, includes creating a first local compressibility heat map by the primary storage array, creating a second local compressibility heat map by the remote storage array, transmitting the first local compressibility heat map from the primary storage array to the remote storage array, transmitting the second local compressibility heat map from the remote storage array to the primary storage array, generating a first merged compressibility heat map by the primary storage array by merging the first local compressibility heat map and the received second local compressibility heat map, and generating a second merged compressibility heat map by the remote storage array by merging the second local compressibility heat map and the received first local compressibility heat map. In some embodiments, using the exchanged compressibility heat maps to update the per-extent compressibility forecast models includes using the first and second merged compressibility heat maps to update the per-extent compressibility forecast models. In some embodiments, the first and second local compressibility heat maps identify compression write operations implemented by each respective storage array on the extents, and merging includes determining a weighted average compressibility estimate for each respective extent based on numbers of compression write operations by each storage array on the respective extent.

In some embodiments, the operations further include creating an uncompressed extent lookup table on the primary storage array, the uncompressed extent lookup table including addresses of respective extents that have been selected to be not compressed.

In some embodiments, the operations further include receiving a write operation on an extent by the primary storage array, the write operation including an address of the respective extent, determining if the address of the respective extent is contained in the uncompressed extent lookup table. In response to a determination that the address is not contained in the uncompressed extent lookup table, compressing data associated with the write operation prior to storing the data, and in response to a determination that the address is contained in the uncompressed extent lookup table, determining if the address was included in the uncompressed extent lookup table due to high IO activity or high compressibility.

In some embodiments, in response to a determination that the address was included in the uncompressed extent lookup table due to high IO activity, the operations further include determining if additional data reduction is required, in response to a determination that additional data reduction is required, compressing the data associated with the write operation prior to storing the data, and in response to a determination that additional data reduction is not required, not compressing the data associated with the write operation prior to storing the data.

In some embodiments, in response to a determination that the address was included in the uncompressed extent lookup table due to high compressibility, implementing Bayesian sampling to determine if the data associated with the write operation should be compressed prior to storing the data.

DETAILED DESCRIPTION

Aspects of the inventive concepts will be described as being implemented in a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g., and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, and/or software implemented by computer instructions that are stored on a non-transitory tangible computer-readable medium and implemented by multi-purpose tangible processors, and any combinations thereof.

Figure 1:
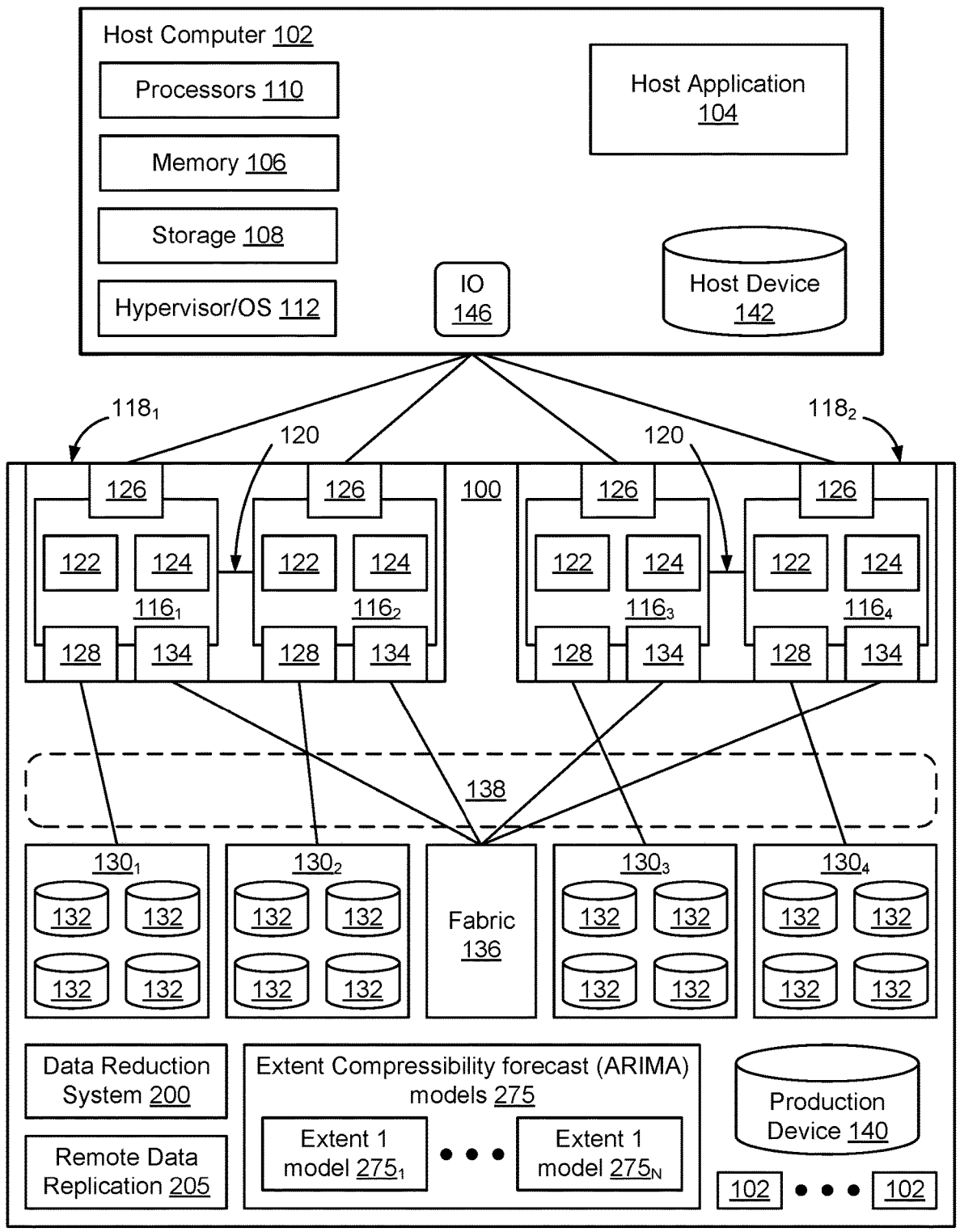
FIG. 1 is a functional block diagram of an example storage system connected to a host computer, according to some embodiments.

FIG. 1 illustrates a storage system 100 and an associated host computer 102, of which there may be many. The storage system 100 provides data storage services for a host application 104, of which there may be more than one instance and type running on the host computer 102. In the illustrated example, the host computer 102 is a server with host volatile memory 106, persistent storage 108, one or more tangible processors 110, and a hypervisor or OS (Operating System) 112. The processors 110 may include one or more multi-core processors that include multiple CPUs (Central Processing Units), GPUs (Graphics Processing Units), and combinations thereof. The host volatile memory 106 may include RAM (Random Access Memory) of any type. The persistent storage 108 may include tangible persistent storage components of one or more technology types, for example and without limitation SSDs (Solid State Drives) and HDDs (Hard Disk Drives) of any type, including but not limited to SCM (Storage Class Memory), EFDs (Enterprise Flash Drives), SATA (Serial Advanced Technology Attachment) drives, and FC (Fibre Channel) drives. The host computer 102 might support multiple virtual hosts running on virtual machines or containers. Although an external host computer 102 is illustrated in FIG. 1, in some embodiments host computer 102 may be implemented as a virtual machine within storage system 100.

The storage system 100 includes a plurality of compute nodes $116_1$-$116_4$, possibly including but not limited to storage servers and specially designed compute engines or storage directors for providing data storage services. In some embodiments, pairs of the compute nodes, e.g. ($116_1$-$116_2$) and ($116_3$-$116_4$), are organized as storage engines $118_1$ and $118_2$, respectively, for purposes of facilitating failover between compute nodes 116 within storage system 100. In some embodiments, the paired compute nodes 116 of each storage engine 118 are directly interconnected by communication links 120. In some embodiments, the communication links 120 are implemented as a PCIe NTB. As used herein, the term "storage engine" will refer to a storage engine, such as storage engines $118_1$ and $118_2$, which has a pair of (two independent) compute nodes, e.g. ($116_1$-$116_2$) or ($116_3$-$116_4$). A given storage engine 118 is implemented using a single physical enclosure and provides a logical separation between itself and other storage engines 118 of the storage system 100. A given storage system 100 may include one storage engine 118 or multiple storage engines 118.

Each compute node, $116_1$, $116_2$, $116_3$, $116_4$, includes processors 122 and a local volatile memory 124. The processors 122 may include a plurality of multi-core processors of one or more types, e.g., including multiple CPUs, GPUs, and combinations thereof. The local volatile memory 124 may include, for example and without limitation, any type of RAM. Each compute node 116 may also include one or more front-end adapters 126 for communicating with the host computer 102. Each compute node $116_1$-$116_4$ may also include one or more back-end adapters 128 for communicating with respective associated back-end drive arrays $130_1$-$130_4$, thereby enabling access to managed drives 132. A given storage system 100 may include one back-end drive array 130 or multiple back-end drive arrays 130.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using NVM (Non-Volatile Memory) media technologies, such as NAND-based flash, or higher-performing SCM (Storage Class Memory) media technologies such as 3D XPoint and ReRAM (Resistive RAM). Managed drives 132 may be directly connected to the compute nodes $116_1$-$116_4$, using a PCIe (Peripheral Component Interconnect Express) bus or may be connected to the compute nodes $116_1$-$116_4$, for example, by an IB (InfiniBand) bus or fabric.

In some embodiments, each compute node 116 also includes one or more channel adapters 134 for communicating with other compute nodes 116 directly or via an interconnecting fabric 136. An example interconnecting fabric 136 may be implemented using PCIe (Peripheral Component Interconnect Express) or InfiniBand. Each compute node 116 may allocate a portion or partition of its respective local volatile memory 124 to a virtual shared memory 138 that can be accessed by other compute nodes 116 over the PCIe NTB links.

The storage system 100 maintains data for the host applications 104 running on the host computer 102. For example, host application 104 may write data of host application 104 to the storage system 100 and read data of host application 104 from the storage system 100 in order to perform various functions. Examples of host applications 104 may include but are not limited to file servers, email servers, block servers, and databases.

Logical storage devices are created and presented to the host application 104 for storage of the host application 104 data. For example, as shown in FIG. 1, a production device 140 and a corresponding host device 142 are created to enable the storage system 100 to provide storage services to the host application 104.

The host device 142 is a local (to host computer 102) representation of the production device 140. Multiple host devices 142, associated with different host computers 102, may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (Logical Block Addresses) on which data used by the host application 104 resides and can be stored. However, the data used by the host application 104 and the storage resources available for use by the host application 104 may actually be maintained by the compute nodes $116_1$-$116_4$ at non-contiguous addresses (tracks) on various different managed drives 132 on storage system 100.

In some embodiments, the storage system 100 maintains metadata that indicates, among various things, mappings between the production device 140 and the locations of extents of host application data in the virtual shared memory 138 and the managed drives 132. In response to an IO (Input/Output command) 146 from the host application 104 to the host device 142, the hypervisor/OS 112 determines whether the IO 146 can be serviced by accessing the host volatile memory 106. If that is not possible then the IO 146 is sent to one of the compute nodes 116 to be serviced by the storage system 100.

In the case where IO 146 is a read command, the storage system 100 uses metadata to locate the commanded data, e.g., in the virtual shared memory 138 or on managed drives 132. If the commanded data is not in the virtual shared memory 138, then the data is temporarily copied into the virtual shared memory 138 from the managed drives 132 and sent to the host application 104 by the front-end adapter 126 of one of the compute nodes $116_1$-$116_4$. In the case where the IO 146 is a write command, in some embodiments the storage system 100 copies a block being written into the virtual shared memory 138, marks the data as dirty, and creates new metadata that maps the address of the data on the production device 140 to a location to which the block is written on the managed drives 132.

It is possible to replicate data from a primary R1 storage array to a remote R2 storage array using a Remote Data Replication (RDR) facility, on which data from a primary R1 storage array is replicated to a remote R2 storage array. For example, in some embodiments the storage system 100 includes a remote data replication system 205 configured to enable the storage array to participate in remote data replication facilities. Although some embodiments are described and illustrated in which a remote data replication facility is implemented using a single primary R1 storage array and a single remote R2 storage array, it should be understood that a given remote data replication facility may include more than one primary R1 storage array and/or more than one remote R2 storage array depending on the configuration of the remote data replication facility.

Figure 3:
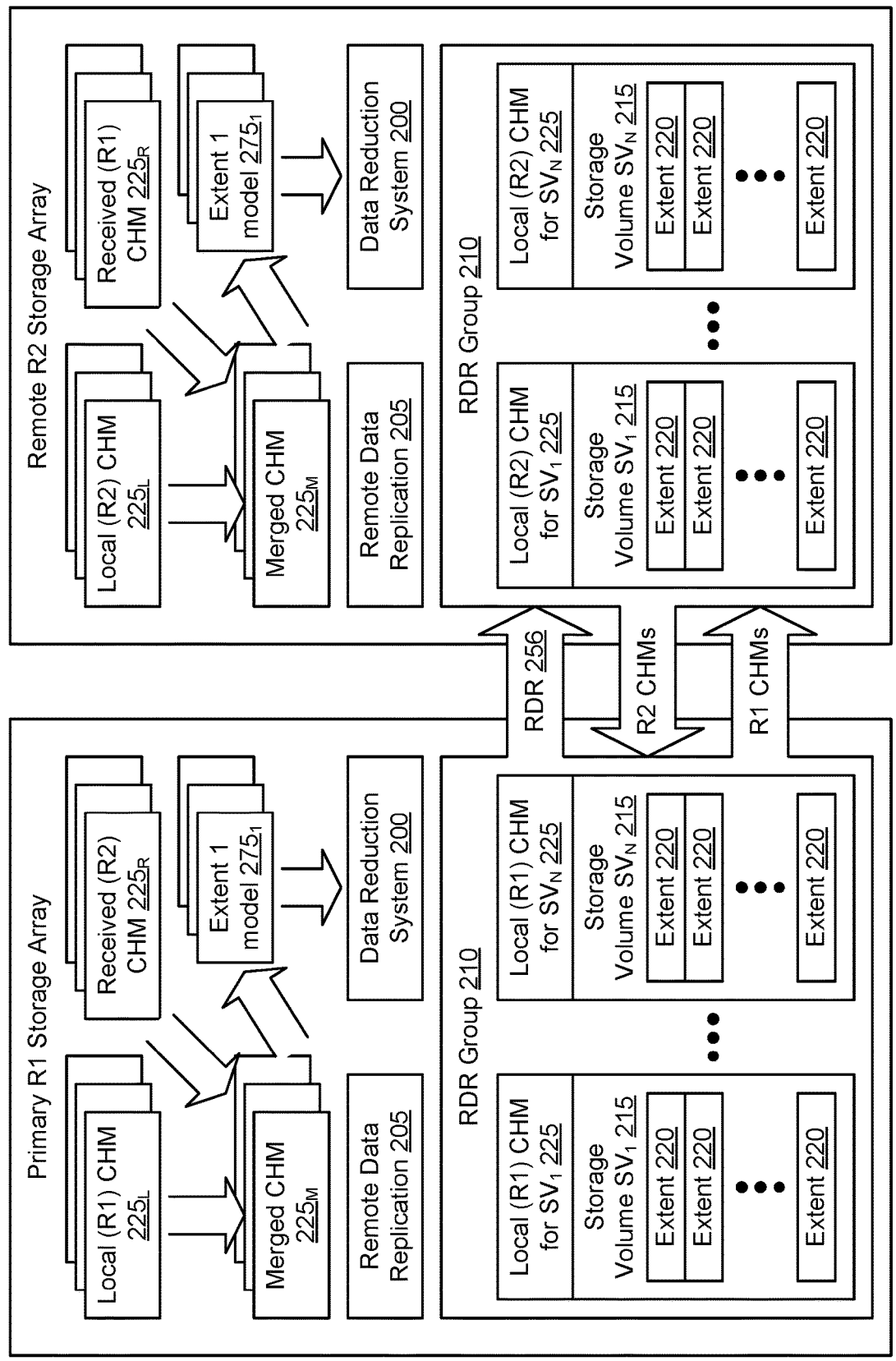
FIG. 3 is a functional block diagram of an example primary R1 storage array and remote R2 storage array configured to implement compression orchestration on a remote data replication facility, according to some embodiments.

As shown in FIG. 1, in some embodiments a storage array 100 will include an operating system, a data reduction system 200, a remote data replication system 205, and a set of remote data replication groups 210 (see FIG. 3). In some embodiments, each RDR group 210 includes one or more storage volumes 215, that is mirrored on an RDR facility created for the RDR group. Each storage volume has a plurality of extents 220, which are units of storage in the storage resources that are accessed by host. A given storage system may participate in multiple RDR groups both as a primary R1 storage array and as a remote R2 storage array.

As shown in FIG. 1, in some embodiments the storage system creates and maintains a set of per-extent compressibility forecast models 275 which may be implemented, for example, as Auto-Regressive Integrated Moving Average (ARIMA) models. As shown in FIG. 1, for example, in some embodiments the storage system creates a separate compressibility forecast model 275I-275N, one ARIMA model for each extent of the remote data replication group 210. Using per-extent compressibility forecast models 275 enables the data reduction system 200 to predict the compressibility of an extent during an upcoming forecast period, given the previous compressibility measurements of the extent during a preceding set of measurement periods. Although some embodiments are described in which the per-extent compressibility predictions are based on ARIMA models, it should be understood that other compressibility forecast models may be used as well, depending on the implementation.

An example remote data replication facility 256 is shown in greater detail in FIG. 3. As shown in FIG. 3, in a remote data replication facility, a set of storage volumes 215 that are included in a remote data replication group 210 are mirrored from a primary R1 storage array to a remote R2 storage array. The remote data replication group 210 may include multiple storage volumes 215, each of which has a plurality of tracks/extents 220. Host IO operations 200, including read operations and write operations, are implemented on the storage volumes 215 of the remote data replication group 220.

Remote Data Replication (RDR) facilities are referred to as either a synchronous remote data replication facility or as an asynchronous remote data replication facility, depending on the manner in which host write IO operations are handled by the primary R1 storage array on the remote data replication facility. In a synchronous remote data replication facility, data is written to the primary R1 storage array and mirrored by the primary R1 storage array to the remote R2 storage array, before the primary R1 storage array acknowledging the write IO to the host. In an asynchronous remote data replication facility, data is written to the primary R1 storage array, acknowledged by the primary R1 storage array to the host, and then subsequently written from the primary R1 storage array to the remote R2 storage array in an asynchronous manner.

Compression techniques can increase the storage capacity of a storage array, by causing a given volume of data to be reduced in size prior to being stored in storage resources of the storage system. However, compressing data can affect performance of the storage array, because when data is compressed for storage in the storage resources, when the data is requested by a host, the data must first be uncompressed before being provided to the host. Accordingly, compressing data prior to storing the data on the storage array can result in performance degradation, since decompressing data takes a finite amount of time.

Activity Based Compression (ABC) is used in some storage arrays to identify extents of data that have high IO activity (a high ABC IO score), and to selectively store extents of data with higher IO activity in uncompressed form on the storage array. The amount of data that is stored in uncompressed form may be varied, depending on the target system performance and data reduction requirements.

Depending on the configuration, the data stored on the remote R2 storage array might have different target system performance and data reduction requirements. Current remote data replication facilities exchange Activity Based Compression (ABC) maps that are created at the primary R1 storage array based on extent IO activity, and are transmitted from the primary R1 storage array to the remote R2 storage array. The exchange of ABC maps enables the remote R2 storage array to identify extents of data with high IO activity levels at the primary R1 storage array.

However, it has been observed that extents with high IO activity levels do not necessarily have good compressibility characteristics. Accordingly, when compression decisions at the remote R2 storage array are based entirely on extent IO activity levels, the remote R2 storage array might select data for compression that has low compressibility. This can result in a sub-optimal use of compression resources on the remote R2 storage array, and make it difficult for the remote R2 storage array to meet both its target system performance and data reduction requirements.

According to some embodiments, the primary R1 storage array and remote R2 storage array create compressibility heat maps and periodically exchange the compressibility heat maps over the remote replication facility. During each compressibility heat map exchange cycle, the primary R1 storage array and remote R2 storage array merge their locally generated compressibility heat map with the compressibility heat map received from the other storage array, to generate a merged compressibility heat map. The primary R1 storage array also forwards the ABC heat map describing extent IO activity to the remote R2 storage array. After merging the compressibility heat maps, each of the primary R1 storage array and remote R2 storage array use the merged compressibility heat maps $225_M$ to update per-extent compressibility forecasting models, to determine forecast compressibility values on a per-extent basis. The primary R1 storage array and remote R2 storage array use the per-extent compressibility forecasting models and the ABC heat map to make compression decisions to select a first subset of extents for be stored in compressed form and a second subset of extents to be stored in uncompressed form. Since the different storage arrays might have different performance and data reduction rate targets, the different storage arrays might include different extents in each of the first and second subsets. By considering both the ABC IO score as well as forecast compressibility score, it is possible to prioritize compression resources by selecting the extents that are forecast to be the most compressible, and which also have the lowest IO scores for compression, while selectively enabling extents with higher ABC IO scores and high forecast compressibility scores to also be selected for compression.

Figure 2:
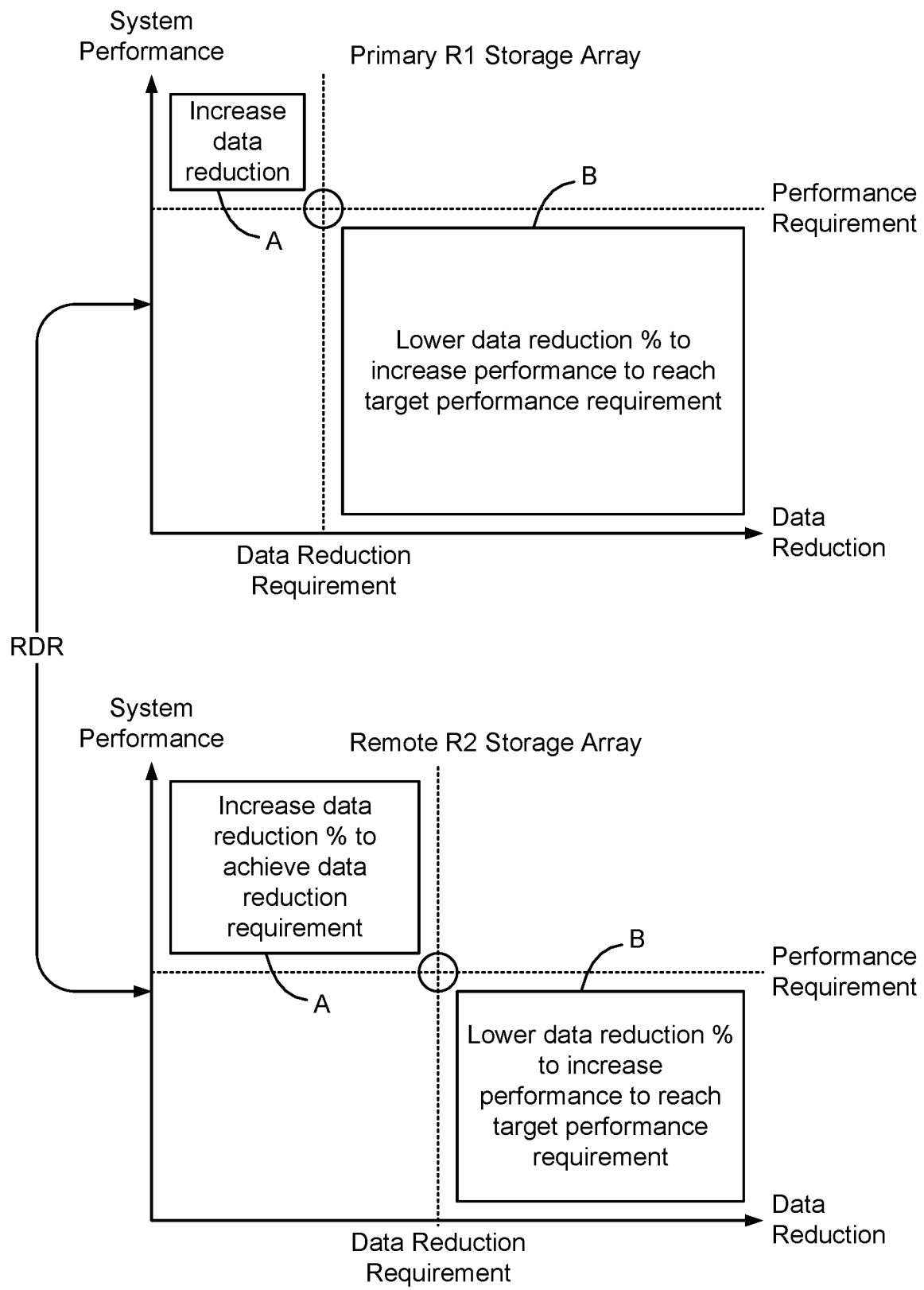
FIG. 2 is an example set of graphs showing the relationship between system performance and data reduction of an example primary R1 storage array and example remote R2 storage array implementing a remote data replication facility, in which different data reduction rate targets and different performance targets are specified for the two storage arrays, according to some embodiments.

FIG. 2 is an example set of graphs showing the relationship between system performance and data reduction of an example primary R1 storage array and example remote R2 storage array implementing a remote data replication facility, in which different data reduction rate targets and different performance targets are specified for the two storage arrays, according to some embodiments. As shown in FIG. 2, in some instances different target metrics for performance and data reduction may be specified for the primary R1 storage array and remote R2 storage array. For example, a user may want the primary R2 storage array to provide higher performance, which will require a greater proportion of extents 220 to be stored in uncompressed form. By contrast, the user may want the remote R2 storage array to provide a higher data reduction ratio, such that storing the mirrored copy of the storage volumes 215 of the storage group 210 on the remote R2 storage array consumes less storage resources of the remote R2 storage array.

As shown in FIG. 2, in some embodiments the data reduction system 200 is required to meet the combined target values of system performance and data reduction requirements (the circle in each graph of FIG. 2). If the system performance increases above the target performance requirement, the amount of data (percentage of extents) compressed by the data reduction system 200 is increased, thereby reducing the system performance while increasing the data reduction ratio (Block A). If the system performance decreases below the target performance requirement, the amount of data (percentage of extents) compressed by the data reduction system 200 is decreased thereby increasing the system performance while decreasing the data reduction ratio (Block B). By adjusting the amount of data that is compressed, it is possible to adjust both the compressibility of the data and the overall system performance to meet the combined target values of the system.

FIG. 3 is a functional block diagram of an example primary R1 storage array and remote R2 storage array configured to implement compression orchestration on a remote data replication facility, according to some embodiments. As shown in FIG. 3, in some embodiments a primary R1 storage array and a remote R2 storage array are configured to implement a remote data replication facility 256. As part of the remote data replication facility 256, the primary R1 storage array and a remote R2 storage array are configured to implement compression orchestration, to enable compression decisions implemented by the data reduction systems 200 to be based not only on ABC IO score data, but also based on forecast compressibility estimates for the extents 220 of the storage volumes 215 of the RDR groups 210.

As shown in FIG. 3, in some embodiments each storage array creates a local compressibility heat map $225_L$ based on compression operations implemented on extents 220 of the set of storage volumes 215 as the extents 260 are accessed by hosts. Each storage array transmits its locally created compressibility heat map $225_L$ to the other storage array on the remote data replication facility 256. When an array receives a compressibility heat map 225 on the remote data replication facility 256, the array stores the received compressibility heat map as "received" compressibility heat map $225_R$. Each array merges its local compressibility heat map $225_L$ with the received compressibility heat map $225_R$ to create a merged compressibility heat map $225_M$. In some embodiments, the merged compressibility heat map $225_M$ on the primary R1 storage array and remote R2 storage array are the same; in some embodiments they are different. Because both storage arrays independently use the merged compressibility heat maps to update per-extent compressibility forecasting models 275, and then separately identify extents to be compressed to meet separate compressibility and performance targets, it is not essential that the two merged compressibility heat maps used by primary R1 storage array and remote R2 storage array be the same at all times. However, since the two storage arrays use similar data and similar merge processes to create the merged compressibility heat maps $225_M$, it would be expected that the two merged compressibility heat maps $225_M$ would often be substantially similar in many aspects. Additional details regarding transmission of compressibility heat maps and merging the compressibility heat maps is described in greater detail in connection with FIG. 6.

Although FIG. 3 shows some embodiments in which two storage arrays are participating in a remote data replication facility, it should be understood that more than two storage arrays (three or more storage arrays) may participate in a remote data replication facility 256 and, accordingly, multiple storage arrays may create and exchange compression heat maps with each other. In instances where three or more storage arrays are implementing a remote data replication facility 256, it should be understood that each storage array would create its own local compression heat map $225_L$, and would then receive multiple "received" compression heat maps $225_R$—one from each of the other storage arrays participating in the remote data replication facility. Each storage array participating in the remote data replication facility 256 would then individually create its own merged heat map $225_M$ by merging its local compression heat map $225_L$ with each of the multiple received compression heat maps $225_R$.

Figure 4:
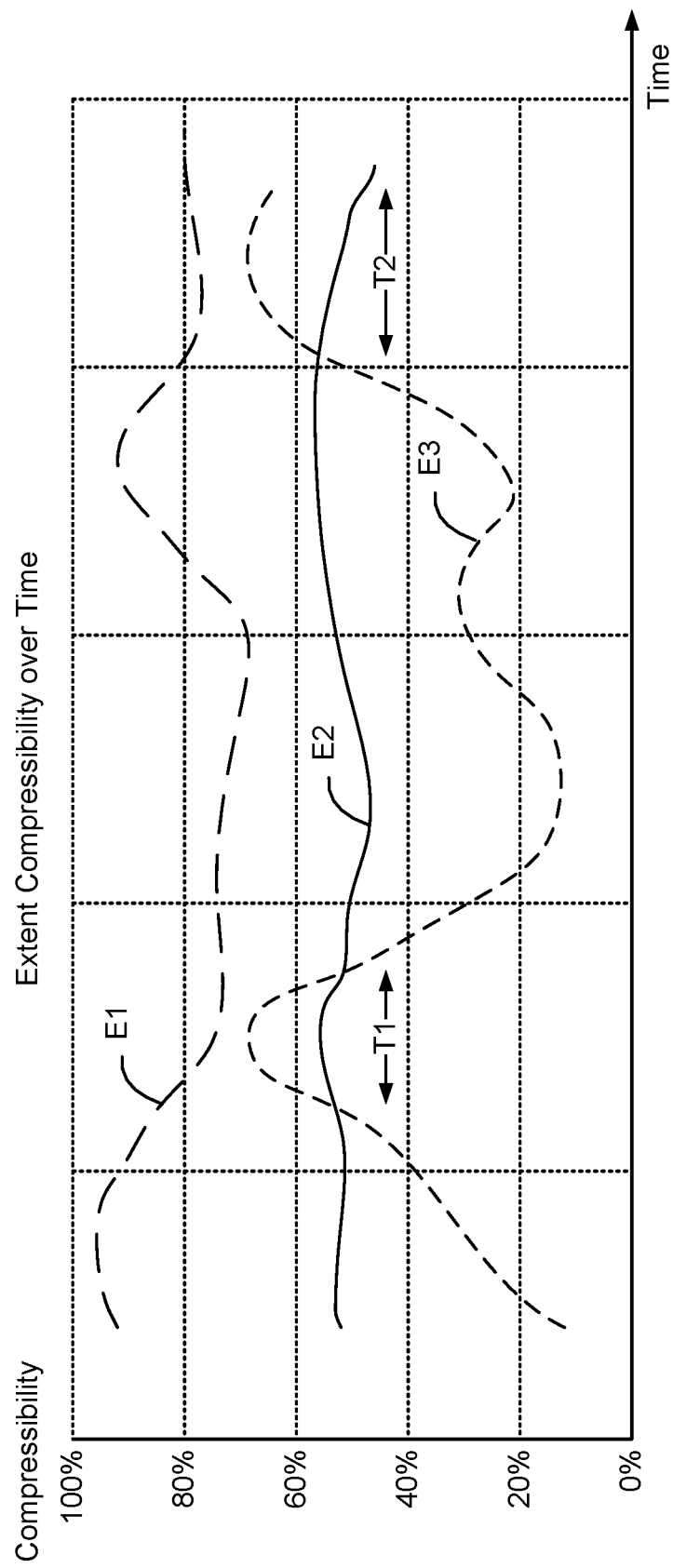
FIG. 4 is graph visually depicting a hypothetical variation of a set of extent compressibility values over time, according to some embodiments.

FIG. 4 is graph visually depicting a hypothetical variation of a set of extent 220 compressibility values over time, according to some embodiments. As shown in FIG. 4, in some embodiments extents 220 have varying compressibility values that change over time. For example, in FIG. 4 extent E1 has a compressibility that is quite high, and varies between approximately 65% and 95%. Extent E2 has a relatively constant compressibility value, that hovers around 50%. Extent E2 has a widely variable compressibility value that is shown fluctuating between approximately 10% and 70%.

If the system elects to compress two extents, and all extents have the same ABC IO score, to achieve an optimal data reduction ratio it would be preferable to select extents with the highest forecast compressibility values. Accordingly, in some instances it is preferable to select extents E1 and E2 for compression. However, in instances where the compressibility of extent E3 is forecast to be higher than extent E2, for example at times T1 and T2, it may be preferable to select extents E1 and E3 for compression.

Figure 5:
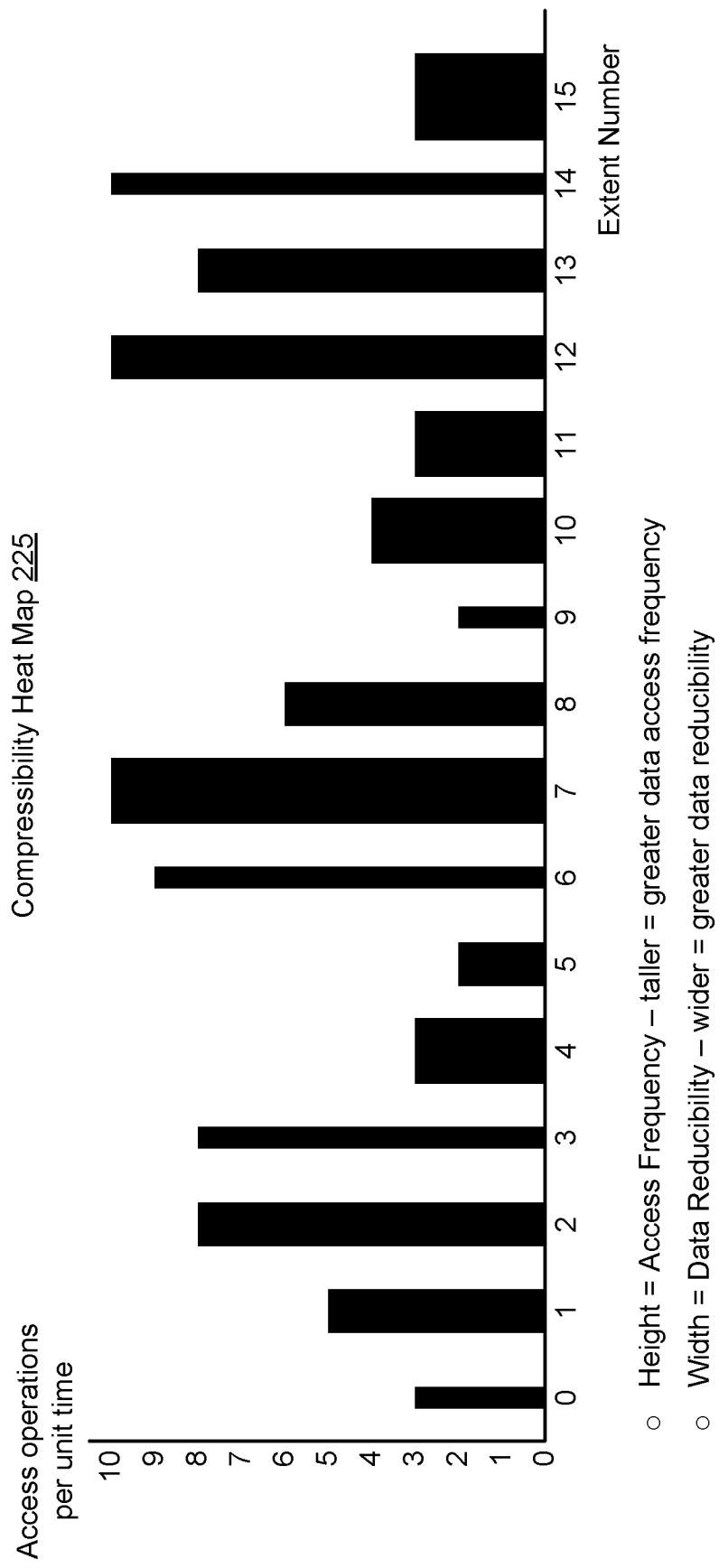
FIG. 5 is an example visualization of an example compressibility heat map, according to some embodiments.

To estimate compressibility of extents over time, in some embodiments the primary R1 storage array and backup R2 storage array exchange compressibility heat maps 225 on the remote data replication facility 256 and use the compressibility heat maps to update per-extent compressibility forecast models 275. FIG. 5 is an example visualization of an example compressibility heat map 225, according to some embodiments. It should be understood that the particular data structure used to implement the compressibility heat maps 225 will depend on the particular implementation. In some embodiments, each compressibility heat map is implemented as a data structure that includes, for each extent, the number of access operations on the extent, the type of data access operations on the extent (e.g., read IO, write IO, etc.) and the amount of data reducibility determined for the extent in connection with the access operations.

In FIG. 5, a visualization of a portion of an example compressibility heat map is shown as a bar graph including a bar for each extent, in which the height of the bar is the access frequency on the extent and the width of the bar is the compressibility. A bar with a larger height is used to visualize an extent with a larger access frequency, and a bar with a larger width is used to show extents with greater data reducibility. Extents with low access frequency (short height) and high reducibility (larger width) are candidates for compression. In FIG. 5, extents 4, 10, 11, and 15 meet this criteria. Extents with high access frequency (tall height) and low reducibility (narrow width) are candidates to be kept uncompressed. In FIG. 5, extents 3, 6, and 14 meet this criteria. The other extents may be selected for compression or kept in uncompressed form depending on the particular target system performance and target data reduction rate, as described in greater detail herein.

In some embodiments, extent compressibility is maintained over time, for example as shown in FIG. 4, and an Auto-Regressive Integrated Moving Average (ARIMA) model 275 is built for each extent to predict the future compressibility of the extent, given a set of previous compressibility determinations for the extent from previously exchanged compressibility heat maps 225 and the current compressibility heat map 225. An ARIMA model enables time-series forecasting that includes the ability to account for periodicity in the compressibility of the extents. Other time-series forecasting models may be used to implement the per-extent compressibility forecast models 275 instead of ARIMA models, such as Exponential Moving Average (EMA) models or Simple Moving Average (SMA) models, depending on the particular implementation. In some embodiments, the compressibility forecast model provides a compressed write forecast, which is used in addition to host writes, to understand how much of the data was sampled and to provide a predicted compressibility for each extent.

Figure 6:
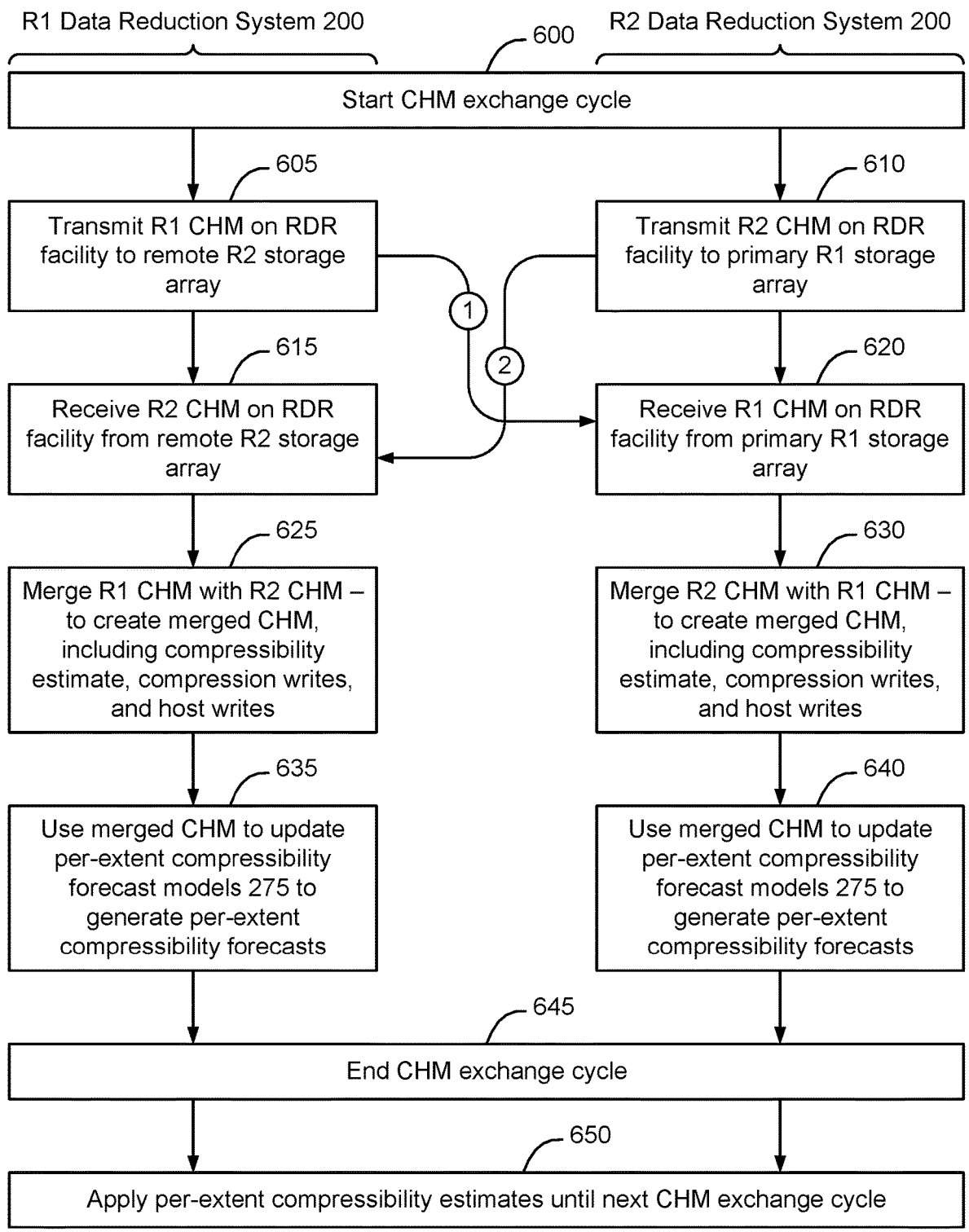
FIG. 6 is a flowchart of an example method of a Compressibility Heat Map (CHM) exchange cycle implemented by the primary R1 storage array and remote R2 storage array in connection with implementing compression orchestration on a remote data replication facility, according to some embodiments.

FIG. 6 is a flowchart of an example method of a Compressibility Heat Map (CHM) exchange cycle implemented by the primary R1 storage array and remote R2 storage array in connection with implementing compression orchestration on a remote data replication facility, according to some embodiments. As shown in FIG. 6, periodically the storage arrays participating in a remote data replication facility implement a compressibility heat map exchange cycle (block 600). During the compressibility heat map exchange cycle, the data reduction systems 200 on the primary R1 and remote R2 storage arrays exchange per-extent compressibility information and use the per-extent compressibility information to update their per-extent compressibility forecast models 275. The updated per-extent compressibility forecast models 275 are then used to provide per-extent forecast compressibility values for the upcoming CHM cycle, that are used by the data reduction system 200 to make compression decisions to select extents for compression during the upcoming CHM cycle (block 650).

Although FIG. 6 shows some embodiments in which two storage arrays are participating in a remote data replication facility, it should be understood that multiple storage arrays may participate in a remote data replication facility 256 and, accordingly, multiple storage arrays may create and exchange compression heat maps with each other. In instances where three or more storage arrays are implementing a remote data replication facility 256, it should be understood that each storage array would create its own local compression heat map $225_L$, and would then receive multiple remote compression heat maps $225_R$.

Additionally, FIG. 6 shows some embodiments in which the compressibility heat map exchange cycle is implemented synchronously by the storage arrays of a remote data replication facility 256. It should be understood that the data reduction system 200 on the primary R1 storage array and the data reduction system 200 on the remote R2 storage array may exchange compressibility heat maps asynchronously, depending on the implementation. For example, in some embodiments each storage array (both R1 and R2) maintains a local compressibility heat map $225_L$ based on actual compressibility information determined by the respective storage array. For example, when one of the storage arrays receives a write operation on an extent, and actually compresses the data of the extent prior to storing the data, the storage array updates its local compressibility heat map $225_L$ based on the most recent compressibility information for the portion of the extent affected by the write operation. In embodiments where the storage arrays are operating asynchronously, when one of the storage arrays receives a compressibility heat map $225_R$ from another storage array, it merges its current local compressibility heat map $225_L$ with the received compressibility heat map $225_R$, to create a new merged compressibility heat map $225_M$. Since each storage array operates independently, and maintains separate per-extent compressibility forecast models 275 that are independently updated based on locally created merged compressibility heat maps $225_M$, it is not necessary for the multiple storage arrays to synchronize exchange of compressibility heat maps. However, for ease of description, FIG. 6 shows some embodiments in which the primary R1 storage array and remote R2 storage array implement the exchange of compressibility heat maps in a coordinated manner at the start of each CHM exchange cycle. An example length of a CHM exchange cycle may be on the order of four hours, or another period of time, depending on the particular implementation.

In the example shown in FIG. 6, at the start of a CHM exchange cycle (block 600) the R1 data reduction system 200 on the primary R1 storage array transmits its local R1 compressibility heat map $225_L$ on the remote data replication facility to the remote R2 storage array (block 605, arrow 1). Likewise, in the example shown in FIG. 6, the R2 data reduction system 200 on the remote R2 storage array transmits its local R2 compressibility heat map $225_L$ on the remote data replication facility to the primary R1 storage array (block 610, arrow 2).

The primary R1 storage array receives the compressibility heat map on the remote data replication facility from the remote R2 storage array (block 615) and merges the local compressibility heat map $225_L$ with the received compressibility heat map $225_R$ to create a merged compressibility heat map $225_M$ (block 625). Similarly, the remote R2 storage array receives the compressibility heat map on the remote data replication facility from the primary R1 storage array (block 620) and merges the local compressibility heat map $225_L$ with the received compressibility heat map $225_R$ to create a merged compressibility heat map $225_M$ (block 630). The merged compressibility heat map $225_M$ at both the primary R1 storage array and remote R2 storage array includes a compressibility estimate, as well as the number of compression writes and host writes implemented by each storage array on each respective extent.

In some embodiments, each storage array (R1 and R2) determines an effective per-extent compressibility of the compressibility heat map $225_M$ by calculating a weighted average of the R1 and R2 compressibility estimates, based on the compression write operations implemented by each respective storage array. In some embodiments, the weighted average is based on the compressibility estimate by each storage array times the number of compression write operations the storage array implemented on the extent during a previous compressibility heat map exchange cycle. A "compression write operation" as that term is used herein, is an operation where the storage array receives a write IO operation from a host and elects to compress the host data prior to storing the host data in back-end storage resources. A "compression write operation" accordingly, is a write operation where an extent is actually compressed by the storage array such that the actual compression rate of the extent is determined by the data reduction system 200.

For example, the primary R1 storage array is responsible for responding to both host read and host write operations, and hence may have a larger number of IO operations on a given extent than the remote R2 storage array. However, the primary R1 storage array may elect to not compress the extent and maintain the data in uncompressed form on the primary R1 storage array, whereas the remote R2 storage array may elect to compress the extent prior to storing the extent. Accordingly, the compressibility estimate, in some embodiments, is based on the number of compressed write operations implemented by each storage array during the compressibility heat map exchange cycle, since the storage array that has compressed the data associated with a given extent is likely to have a better compressibility estimate than a storage array that has not compressed/uncompressed the data contained in the extent.

Once compressibility heat maps have been exchanged and used to create the merged compressibility heat maps $225_M$, each storage array updates its per-extent compressibility forecast models 275 to generate compressibility forecasts for each extent for an upcoming period of time (blocks 635, 640). In instances where the per-extent compressibility forecast models 275 are implemented using ARIMA models, the ARIMA model for each extent is updated with the most recent compressibility determination for the respective extent, as determined from the merged compressibility heat map $225_M$, and the updated ARIMA models are used to forecast compressibility values for the extents for the upcoming time period. In some embodiments, the upcoming time period corresponds to the time period that extends until the per-extent compressibility forecast models 275 are subsequently updated. For example, in some embodiments the updated per-extent compressibility forecasting models 275 are used to provide per-extent compressibility forecast values until completion of the next subsequent CHM exchange cycle (block 650). An example CHM exchange cycle period may be on the order of four hours, although CHM exchange cycles of other lengths may be used as well depending on the implementation.

After updating the per-extent compressibility forecast models 275, the compressibility heat map exchange cycle ends (block 645). The primary R1 storage array and the remote R2 storage array then use the updated per-extent compressibility forecast models 275 to determine predicted compressibility values for the extents for an upcoming application cycle, for example until the next compressibility heat map exchange cycle (block 650).

Figure 7:
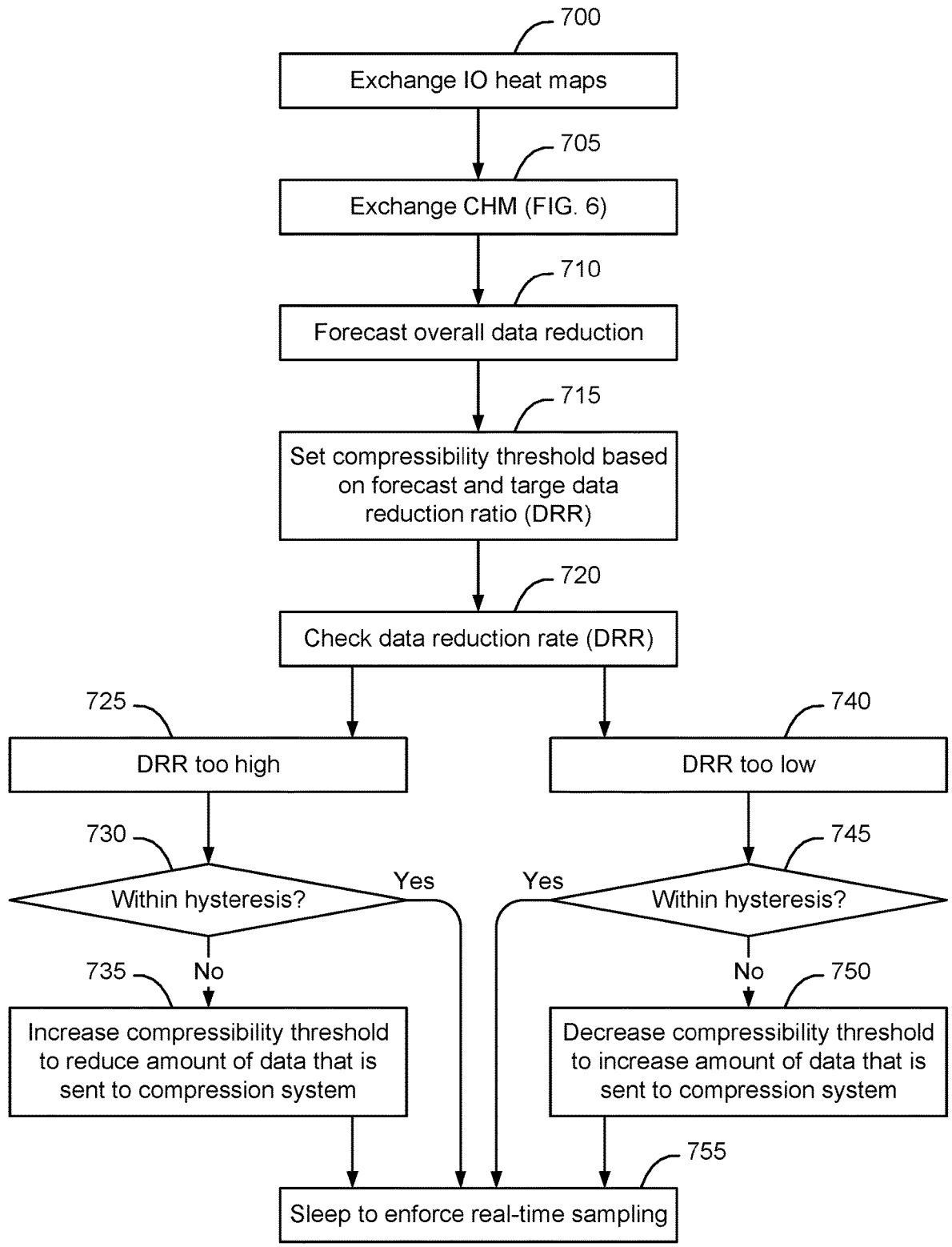
FIG. 7 is a flow chart of an example method of adjusting a compressibility threshold used to determine which extents should be compressed to achieve a target Data Reduction Ratio (DRR) in a system configured to implement compression orchestration on a remote data replication facility, according to some embodiments.

FIG. 7 is a flow chart of an example method of adjusting a compressibility threshold used to determine which extents should be compressed to achieve a target Data Reduction Ratio (DRR) in a system configured to implement compression orchestration on a remote data replication facility, according to some embodiments. As shown in FIG. 7, in some embodiments the storage arrays participating in the remote data reproduction facility 256 exchange Activity Based Compression (ABC) IO heat maps (block 700) as well as compressibility heat maps, for example as described in connection with FIG. 6 (block 705). As described in greater detail herein, ABC heat maps are used to generate compression recommendations based on IO activity levels on the extents, whereas compressibility heat maps are used to update per-extent compressibility forecast models 275 that are used to generate compression recommendations based on forecast compressibility values of the extents.

In some embodiments, the per-extent compressibility forecast models 275 are used by each storage array to forecast an overall data reduction of the system based on a given compressibility threshold. A compressibility threshold, as used herein, refers to a threshold compressibility that is used to determine whether a given extent should be recommended to be compressed based on the expected data reduction associated with compressing the extent. A given extent will be compressed only if the forecast estimated compressibility value for the extent is equal to or higher than the compressibility threshold. For example, if a given extent has a compressibility forecast estimate of 60%, it is estimated that compressing the given extent will reduce the amount of storage required to store the data contained in the extent by 60%. If the compressibility threshold is set at 65%, then the given extent will not be compressed, since the forecast compressibility of the extent is less than the compressibility threshold. By contrast, if the compressibility threshold is set to 50%, then the given extent will be selected to be compressed since the current forecast compressibility estimate for the extent (60%) is above the compressibility threshold (50%). Lowering the compressibility threshold thus causes a larger number of extents to be compressed, whereas increasing the compressibility threshold causes fewer extents to be compressed.

In some embodiments, the compressibility threshold is selected to enable the data reduction system to achieve a target data reduction rate, based on forecast compressibility values of the extents 220. As shown in FIG. 7, in some embodiments, an initial overall data reducibility forecast is generated based on the per-extent compressibility forecast models 275 (block 710) and used to set a compressibility threshold that is expected to meet the overall data reducibility requirement (block 715). In some embodiments the overall data reducibility forecast is based on the predicted average data reducibility of the sum of the extents above the compressibility threshold, based on the per extent forecasts derived from the per-extent compressibility forecast models 275. For example, to achieve a data reduction rate of 60%, it may be necessary to set the data compressibility threshold to 75%, in situations where many of the extents are forecast to be highly compressible, or to set the compressibility threshold to a lower number in situations where fewer of the extents are forecast to be highly compressible.

After setting the initial compressibility threshold (block 715), the selected extents are compressed, and use of storage resources is monitored to determine the actual data reduction rate being achieved through the use of compression (block 720).

Figure 8:
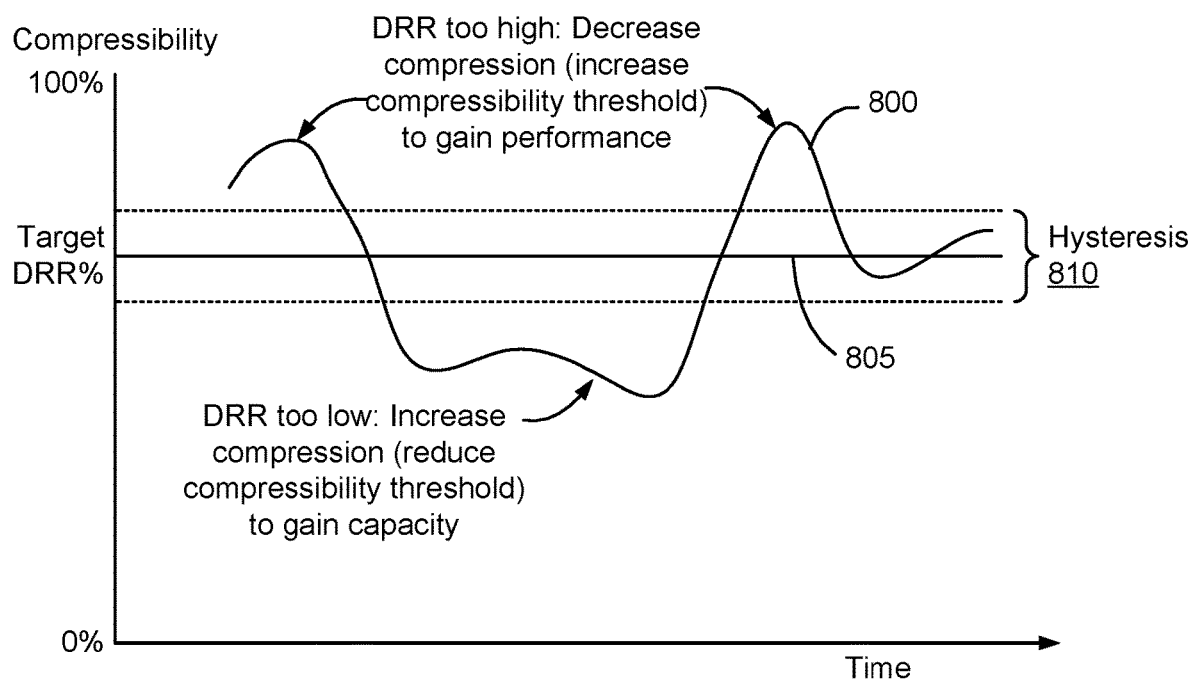
FIG. 8 is graph of compressibility vs. time, visually depicting adjustment of the compressibility threshold in response to variations in Data Reduction Ratio, according to some embodiments.

FIG. 8 is graph of compressibility vs. time, visually depicting adjustment of the compressibility threshold in response to variations in Data Reduction Ratio, according to some embodiments. In some embodiments, the actual data reduction rate 800 (DRR) is compared with a target data reduction rate 805, for example as shown in FIG. 8. In instances where the data reduction rate 800 being achieved is too high (FIG. 7, block 725), in some embodiments a determination is made as to whether the data reduction rate 800 is within a hysteresis region 810 (block 730). By providing a hysteresis region 810 it is possible to avoid constantly adjusting the compressibility threshold, thus preventing particular extents from thrashing between being compressed and uncompressed. In response to a determination that the data reduction rate 800 is within the hysteresis region 810 (a determination of YES at block 730), no adjustment is made to the compressibility threshold and the process sleeps for an interval before iterating the process of real time data reduction rate sampling (block 755). In response to a determination that the data reduction rate 800 is not within the hysteresis region 810 (a determination of NO at block 730), the compressibility threshold is increased to reduce the amount of data that is sent to the compression system, and hence to decrease the overall data reduction rate (DRR). After adjusting the compressibility threshold, the process then sleeps for an interval before iterating the process of real time data reduction rate sampling (block 755).

In instances where the data reduction rate 800 being achieved is too low (FIG. 7, block 740), in some embodiments a determination is made as to whether the data reduction rate is within the hysteresis region 810 (block 745). In response to a determination that the data reduction rate 800 is within the hysteresis region 810 (a determination of YES at block 745), no adjustment is made to the compressibility threshold and the process sleeps for an interval before iterating the process of real time data reduction rate sampling (block 755). In response to a determination that the data reduction rate 800 is not within the hysteresis region 810 (a determination of NO at block 745), the compressibility threshold is reduced to increase the amount of data that is sent to the compression system, and hence to increase the overall data reduction rate (DRR) (block 750). After adjusting the compressibility threshold, the process then sleeps for an interval before iterating the process of real time data reduction rate sampling (block 755).

Figure 9:
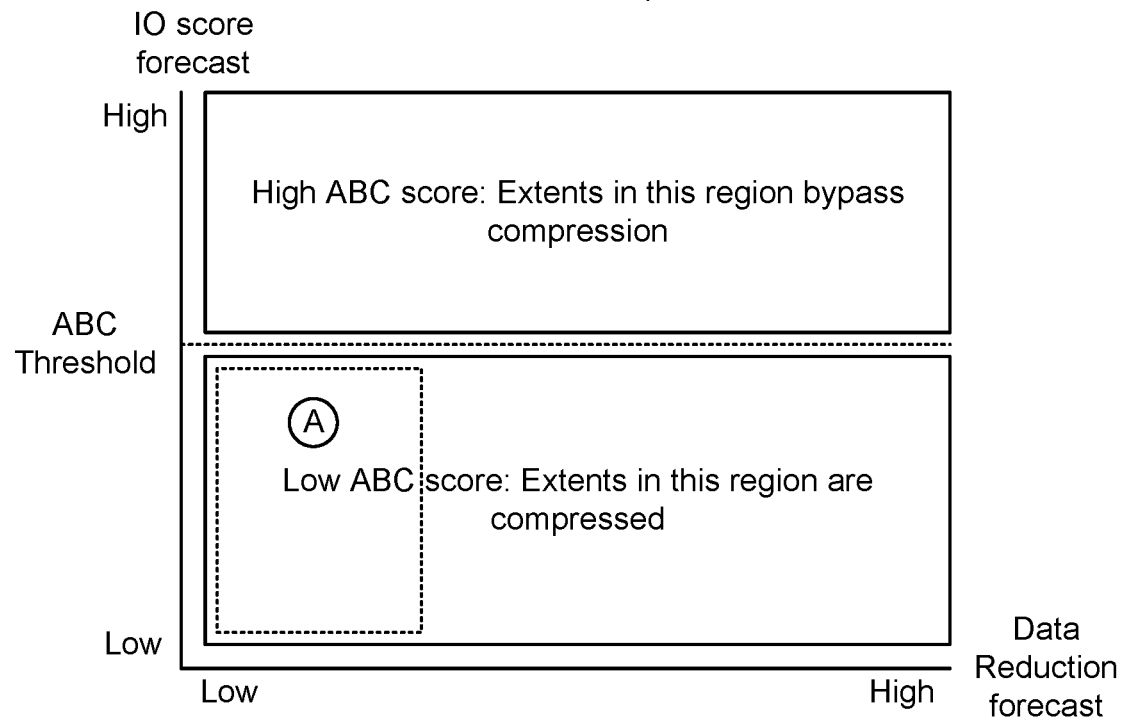
FIG. 9 is graph of activity based extent IO score forecast vs. extent data reduction, showing selection of extents for compression processing based entirely on Activity Based Compression (ABC) IO score, according to some embodiments.

FIG. 9 is graph of activity based extent IO score forecast vs. extent data reduction forecast, showing selection of extents for compression processing based entirely on Activity Based Compression (ABC) IO score, according to some embodiments. As shown in FIG. 9, in systems that only use activity based IO score to determine which extents should be compressed and which extents should remain uncompressed, it is possible that some extents that have very low compressibility (extents in region A) are selected for compression. Specifically, as shown in FIG. 9, in systems that only consider IO activity (ABC score), if an extent has an ABC score above an ABC threshold, the extent will not be compressed regardless of the compressibility of the extent. Likewise, in instances where extents are selected for compression based entirely on ABC score, if the extent has an ABC IO score below the threshold, the extent will be compressed regardless of the level of data reduction that will be achieved by compressing the extent. This results in some extents, for example the extents in the region A of FIG. 9, being selected for compression, even though the overall amount of data reduction achieved by compressing these extents is forecast to be very low.

Figure 10:
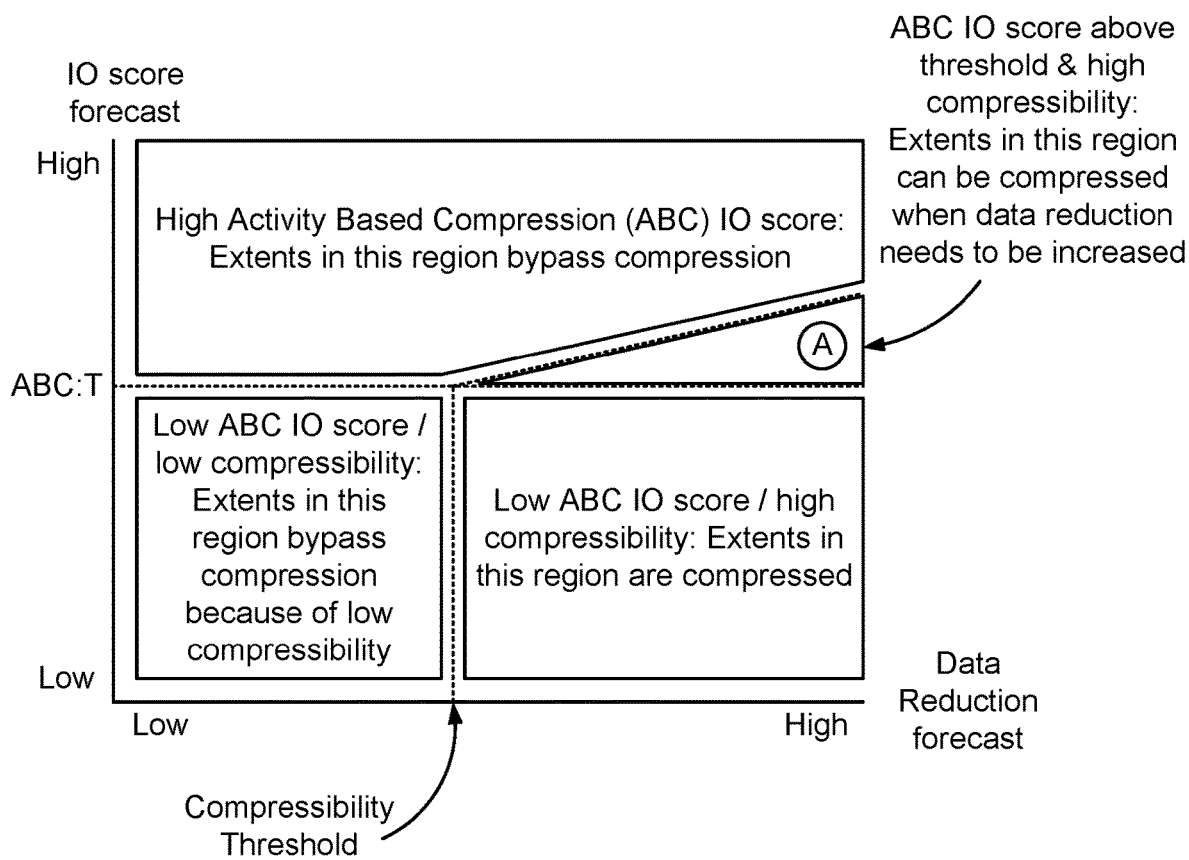
FIG. 10 is graph of activity based extent IO score forecast vs. extent data reduction, showing selection of extents for compression processing based on a combination of ABC IO score and compressibility score, according to some embodiments.

FIG. 10 is graph of activity based extent IO score forecast vs. extent data reduction forecast, showing selection of extents for compression processing based on a combination of ABC IO score and forecast compressibility score, according to some embodiments. As shown in FIG. 10, when both forecast extent compressibility and forecast extent ABC IO score are used to select extents for compression, it is possible to bypass compression for extents with both low ABC IO score and low compressibility, because compressing extents with low forecast compressibility values does not significantly affect the overall data reducibility rate DRR, while consuming resource of the data reduction engine. Likewise, in some situations it is possible to compress some extents that have an ABC IO score above the ABC threshold, for example in situations where the extent have a high compressibility. These extents are shown in the triangular region (region A) of FIG. 10. Specifically, the extents that fall in this region of the graph shown in FIG. 10 (triangular region A) have an ABC IO score that is nominally above the ABC IO threshold, indicating that in normal operation they should be stored in uncompressed form. However, in situations where additional data reduction is required to achieve the target data reduction rate (surge compression), compressing these extents will result in a significant data reduction contribution, given that the extents are forecast to be highlight compressible. For example, in surge compression conditions, where additional data reduction is required to be achieved on one of the storage arrays, it may be preferable to incur additional processing penalties associated with frequently compressing and uncompressing an extent that has a compression ratio of 95% rather than keeping the extent in the uncompressed pool of storage.

Figure 11:
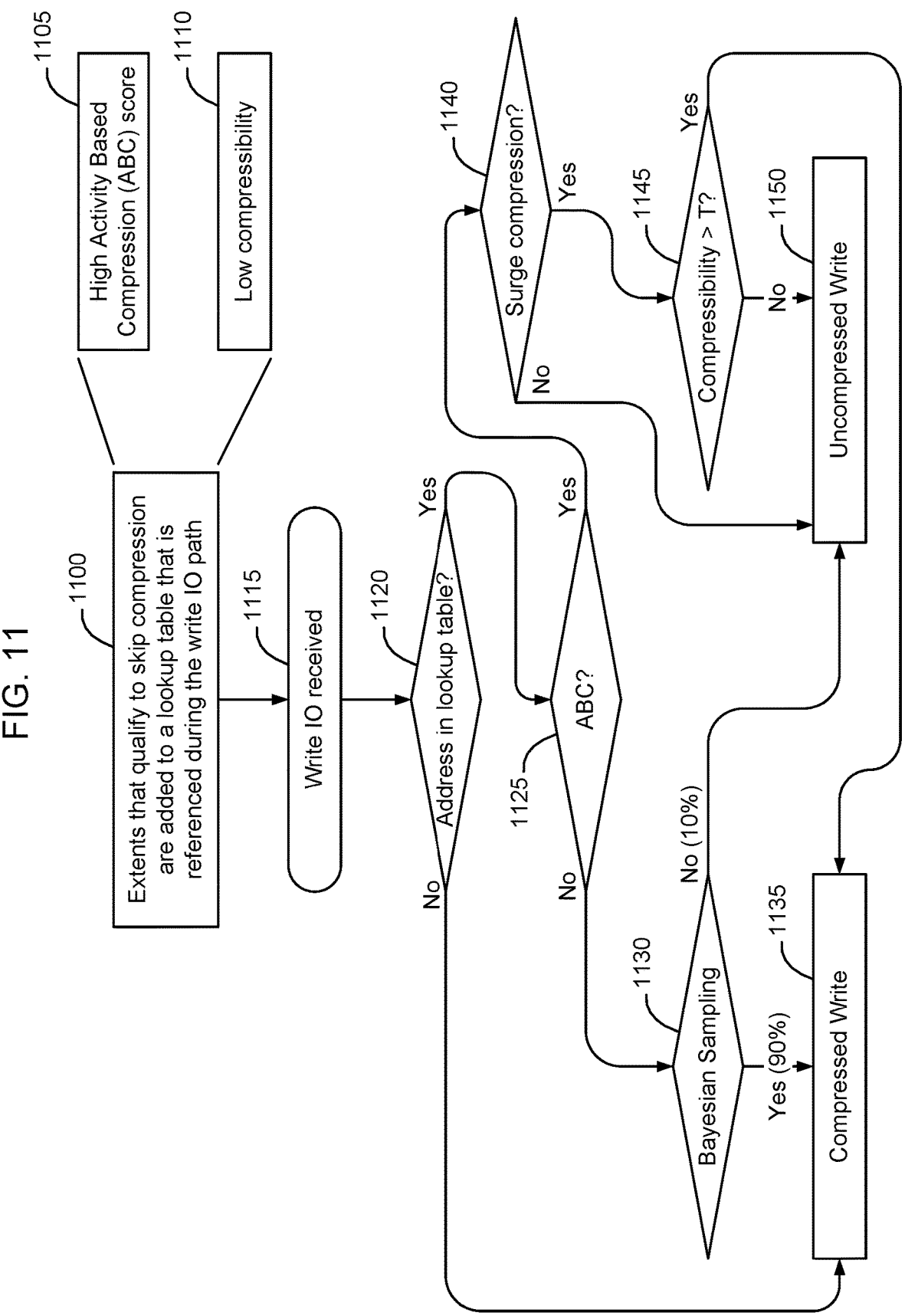
FIG. 11 is a flowchart of an example process of implementing extent compression determinations in a system configured to implement compression orchestration on a remote data replication facility, according to some embodiments.

FIG. 11 is a flowchart of an example process of implementing extent compression determinations in a system configured to implement compression orchestration on a remote data replication facility, according to some embodiments. The process shown in FIG. 11 is implemented separately by the primary R1 storage array and remote R2 storage array, based on each storage array's per-extent compression forecasts that are generated from each storage array's per-extent compressibility forecast models 275, and each storage array's unique target data reduction ratio.

As shown in FIG. 11, in some embodiments extents that qualify to skip compression are added to a lookup table that is referenced during the write IO path (block 1100). An extent can qualify to skip compression based on either a high Activity Based Compression ABC score (block 1105) or based on low forecast compressibility score (block 1110).

When a write is received (block 1115), the write IO path uses the lookup table to determine if the extent is identified in the lookup table as being qualified to skip compression (block 1120). In instances when the extent's address is not in the lookup table (a determination of NO at block 1120), the extent is not qualified to skip compression, and the write IO is a compressed write (block 1135).

If the address of the extent is contained in the lookup table (a determination of YES at block 1120), the extent may be qualified to skip compression because of the high IO activity on the extent (high ABC IO score, block 1105) or because of the low forecast compressibility (block 1110). Accordingly, in some embodiments a determination is made as to whether the address of the extent was included in the lookup table due to a high ABC IO score (block 1125).

In some embodiments, if the extent address was not included in the lookup table because of a high ABC IO score (a determination of NO at block 1125), Bayesian sampling is used to select a small percentage of extents to be implemented as uncompressed writes (block 1130). For example, in some embodiments Bayesian sampling is used to select 90% of extents (a determination of YES at block 1130) to be compressed writes (block 1135) and to select 10% of extents (a determination of NO at block 1130) to be uncompressed writes (block 1150). Using Bayesian sampling enables the compression determination algorithm (FIG. 11) to be sensitive to host data entropy, such that a certain portion of host random write operations are stored as uncompressed data. Random write operations, in some embodiments, refer to write operations from the host that contain new data or write operations that are implemented on data that has not been recently accessed and, accordingly, might not have an accurate compressibility forecast. By using Bayesian sampling, it is possible to distribute this data between compressed and uncompressed storage pools. Although FIG. 11 shows some embodiments in which the Bayesian sampling threshold has been set at 10%, it should be understood that other Bayesian sampling thresholds may be utilized as well, depending on the implementation.

In some embodiments, if the extent address was included in the lookup table because of a high ABC IO score (a determination of YES at block 1125), a determination is made as to whether additional compression is currently required to meet the data reduction rate (DRR) (block 1140). If a determination is made that surge compression is required to achieve the target DRR (a determination of YES at block 1140), and the forecast compressibility of the extent is above a given threshold T (a determination of YES at block 1145)

the write IO is a compressed write (block 1135). If a determination is made that surge compression is not required to achieve the target DRR (a determination of NO at block 1140), or if the forecast compressibility of the extent is below the given threshold T (a determination of NO at block 1145), the write is an uncompressed write (block 1150).

By considering both activity-based compression ABC IO score, and forecast extent compressibility, it is possible to change the selection of which extents are compressed both on the primary R1 storage array and remote R2 storage array of a remote data replication facility. Exchanging compressibility heat maps on a remote data replication facility enables current compressibility information determined by each of the primary R1 storage array and remote R2 storage array to be used in the per-extent compressibility forecast, thus leveraging current compressibility information from all of the storage arrays on the remote data replication facility when each storage array independently selects extents to be compressed. In this way, it is possible to achieve greater data reduction rates on the arrays, or reduce the number of extents that are required to be compressed, to achieve the unique per-array target data reduction rates on each of the storage arrays.

The methods described herein may be implemented as software configured to be executed in control logic such as contained in a CPU (Central Processing Unit) or GPU (Graphics Processing Unit) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a FPGA (Field Programmable Gate Array) or microprocessor, or any other device including any combination thereof. Programmable logic can be fixed temporarily or permanently in a tangible non-transitory computer readable medium such as random-access memory, a computer memory, a disk drive, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated. The term "about" is used to indicate that a value includes the standard level of error for the device or method being employed to determine the value. The use of the term "or" in the claims is used to mean "and/or" unless explicitly indicated to refer to alternatives only or the alternatives are mutually exclusive, although the disclosure supports a definition that refers to only alternatives and to "and/or." The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and also covers other unlisted steps.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of compression orchestration on a remote data replication facility including a primary storage array and a remote storage array, comprising:
    synchronizing extents of data between the primary storage array and the remote storage array over the remote data replication facility as host write operations occur on the extents of data on the primary storage array;
    transmitting an IO activity heat map from the primary storage array to the remote storage array on the remote data replication facility;
    exchanging compressibility heat maps between the primary storage array and remote storage array over the remote data replication facility, each respective compressibility heat map containing per-extent compressibility information determined by the respective primary storage array or remote storage array;
    creating a per-extent compressibility forecast model for each extent of data by each of the primary storage array and remote storage array, each per-extent compressibility forecast model being based on a set of previously observed compressibility values for the extent over a preceding set of previous time periods;
    using the exchanged compressibility heat maps to update the per-extent compressibility forecast models;
    determining a forecast compressibility value for each extent from the updated per-extent compressibility forecast models for an upcoming time period;
    selecting a first set of extents to be compressed by the primary storage array based on the IO activity heat map, per-extent forecast compressibility values for each extent determined from the updated per-extent compressibility forecast models on the primary storage array, and a first target data reduction rate on the primary storage array; and
    selecting a second set of extents to be compressed by the remote storage array based on the IO activity heat map, per-extent forecast compressibility values for each extent determined from the updated per-extent compressibility forecast models on the remote storage array, and a second target data reduction rate on the remote storage array.

2. The method of claim 1, wherein determining the forecast compressibility value for each extent from the updated per-extent compressibility forecast models for an upcoming time period is implemented separately by each of the primary storage array and remote storage array.

3. The method of claim 1, wherein each per-extent compressibility forecast model is an Auto-Regressive Integrated Moving Average (ARIMA) model, an Exponential Moving Average (EMA) model, or a Simple Moving Average (SMA) model.

4. The method of claim 1, wherein exchanging compressibility heat maps between the primary storage array and remote storage array over the remote data replication facility, comprises:

creating a first local compressibility heat map by the primary storage array;

creating a second local compressibility heat map by the remote storage array;

transmitting the first local compressibility heat map from the primary storage array to the remote storage array;

transmitting the second local compressibility heat map from the remote storage array to the primary storage array;

generating a first merged compressibility heat map by the primary storage array by merging the first local compressibility heat map and the received second local compressibility heat map; and generating a second merged compressibility heat map by the remote storage array by merging the second local compressibility heat map and the received first local compressibility heat map.

5. The method of claim 4, wherein using the exchanged compressibility heat maps to update the per-extent compressibility forecast models comprises using the first and second merged compressibility heat maps to update the per-extent compressibility forecast models.

6. The method of claim 4, wherein the first and second local compressibility heat maps identify compression write operations implemented by each respective storage array on the extents, and wherein merging comprises determining a weighted average compressibility estimate for each respective extent based on numbers of compression write operations by each storage array on the respective extent.

7. The method of claim 1, further comprising creating an uncompressed extent lookup table on the primary storage array, the uncompressed extent lookup table including addresses of respective extents that have been selected to be not compressed.

8. The method of claim 7, further comprising receiving a write operation on an extent by the primary storage array, the write operation including an address of the respective extent;

determining if the address of the respective extent is contained in the uncompressed extent lookup table;

in response to a determination that the address is not contained in the uncompressed extent lookup table, compressing data associated with the write operation prior to storing the data; and in response to a determination that the address is contained in the uncompressed extent lookup table, determining if the address was included in the uncompressed extent lookup table due to high IO activity or high compressibility.

9. The method of claim 7, in response to a determination that the address was included in the uncompressed extent lookup table due to high IO activity, determining if additional data reduction is required;

in response to a determination that additional data reduction is required, compressing the data associated with the write operation prior to storing the data; and in response to a determination that additional data reduction is not required, not compressing the data associated with the write operation prior to storing the data.

10. The method of claim 7, in response to a determination that the address was included in the uncompressed extent lookup table due to high compressibility, implementing Bayesian sampling to determine if the data associated with the write operation should be compressed prior to storing the data.

11. A system of compression orchestration on a remote data replication facility including a primary storage array and a remote storage array, comprising:

one or more processors and one or more storage devices storing instructions that are operable, when executed by the one or more processors, to cause the one or more processors to perform operations comprising:

synchronizing extents of data between the primary storage array and the remote storage array over the remote data replication facility as host write operations occur on the extents of data on the primary storage array;

transmitting an IO activity heat map from the primary storage array to the remote storage array on the remote data replication facility;

exchanging compressibility heat maps between the primary storage array and remote storage array over the remote data replication facility, each respective compressibility heat map containing per-extent compressibility information determined by the respective primary storage array or remote storage array;

creating a per-extent compressibility forecast model for each extent of data by each of the primary storage array and remote storage array, each per-extent compressibility forecast model being based on a set of previously observed compressibility values for the extent over a preceding set of previous time periods;

using the exchanged compressibility heat maps to update the per-extent compressibility forecast models;

determining a forecast compressibility value for each extent from the updated per-extent compressibility forecast models for an upcoming time period;

selecting a first set of extents to be compressed by the primary storage array based on the IO activity heat map, per-extent forecast compressibility values for each extent determined from the updated per-extent compressibility forecast models on the primary storage array, and a first target data reduction rate on the primary storage array; and selecting a second set of extents to be compressed by the remote storage array based on the IO activity heat map, per-extent forecast compressibility values for each extent determined from the updated per-extent compressibility forecast models on the remote storage array, and a second target data reduction rate on the remote storage array.

12. The system of claim 11, wherein determining the forecast compressibility value for each extent from the updated per-extent compressibility forecast models for an upcoming time period is implemented separately by each of the primary storage array and remote storage array.

13. The system of claim 11, wherein each per-extent compressibility forecast model is an Auto-Regressive Integrated Moving Average (ARIMA) model, an Exponential Moving Average (EMA) model, or a Simple Moving Average (SMA) model.

14. The system of claim 11, wherein exchanging compressibility heat maps between the primary storage array and remote storage array over the remote data replication facility, comprises:

creating a first local compressibility heat map by the primary storage array;

creating a second local compressibility heat map by the remote storage array;

transmitting the first local compressibility heat map from the primary storage array to the remote storage array;

transmitting the second local compressibility heat map from the remote storage array to the primary storage array;

generating a first merged compressibility heat map by the primary storage array by merging the first local compressibility heat map and the received second local compressibility heat map; and generating a second merged compressibility heat map by the remote storage array by merging the second local compressibility heat map and the received first local compressibility heat map.

15. The system of claim 14, wherein using the exchanged compressibility heat maps to update the per-extent compressibility forecast models comprises using the first and second merged compressibility heat maps to update the per-extent compressibility forecast models.

16. The system of claim 14, wherein the first and second local compressibility heat maps identify compression write operations implemented by each respective storage array on the extents, and wherein merging comprises determining a weighted average compressibility estimate for each respective extent based on numbers of compression write operations by each storage array on the respective extent.

17. The system of claim 11, further comprising creating an uncompressed extent lookup table on the primary storage array, the uncompressed extent lookup table including addresses of respective extents that have been selected to be not compressed.

18. The system of claim 17, further comprising receiving a write operation on an extent by the primary storage array, the write operation including an address of the respective extent;

determining if the address of the respective extent is contained in the uncompressed extent lookup table;

in response to a determination that the address is not contained in the uncompressed extent lookup table, compressing data associated with the write operation prior to storing the data; and in response to a determination that the address is contained in the uncompressed extent lookup table, determining if the address was included in the uncompressed extent lookup table due to high IO activity or high compressibility.

19. The system of claim 17, in response to a determination that the address was included in the uncompressed extent lookup table due to high IO activity, determining if additional data reduction is required;

in response to a determination that additional data reduction is required, compressing the data associated with the write operation prior to storing the data; and in response to a determination that additional data reduction is not required, not compressing the data associated with the write operation prior to storing the data.

20. The system of claim 17, in response to a determination that the address was included in the uncompressed extent lookup table due to high compressibility, implementing Bayesian sampling to determine if the data associated with the write operation should be compressed prior to storing the data.

* * * * *